June 23, 1931.　　　E. K. BAKER　　　1,810,897
CHASSIS SPRING CONTROL
Filed April 18, 1928　　　2 Sheets-Sheet 1
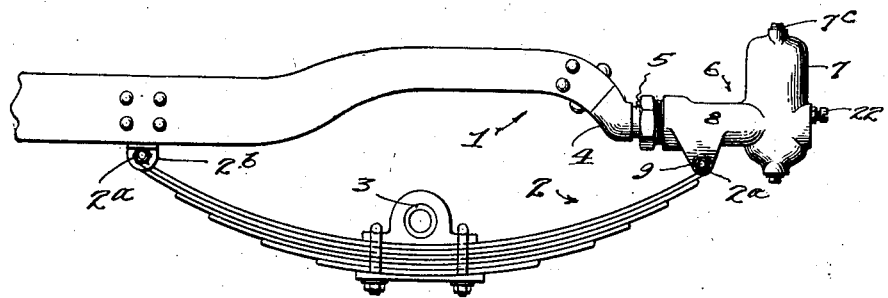
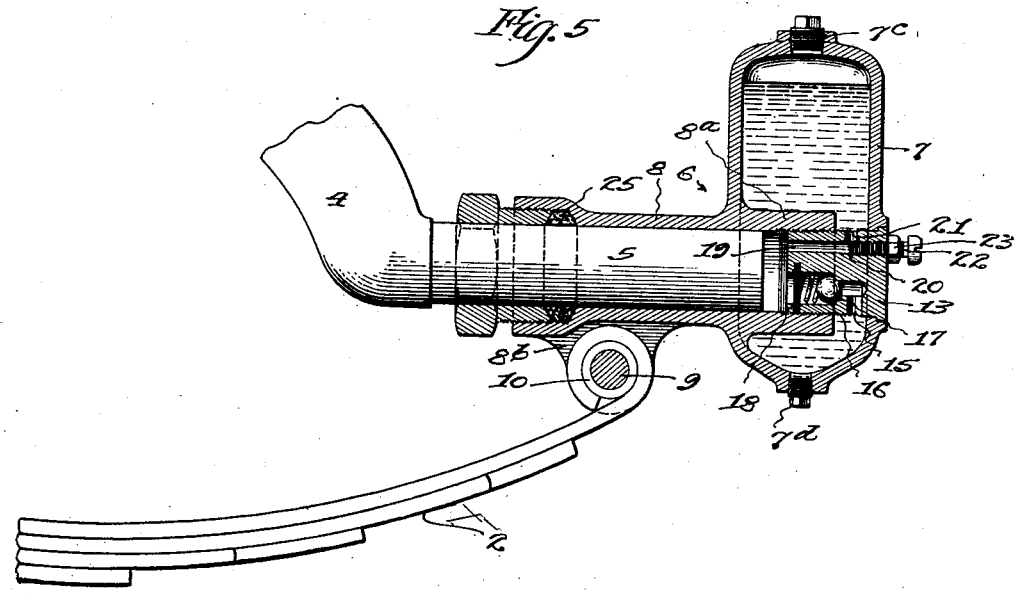
Inventor:
Erle K. Baker
by Arthur W Nelson
Atty.

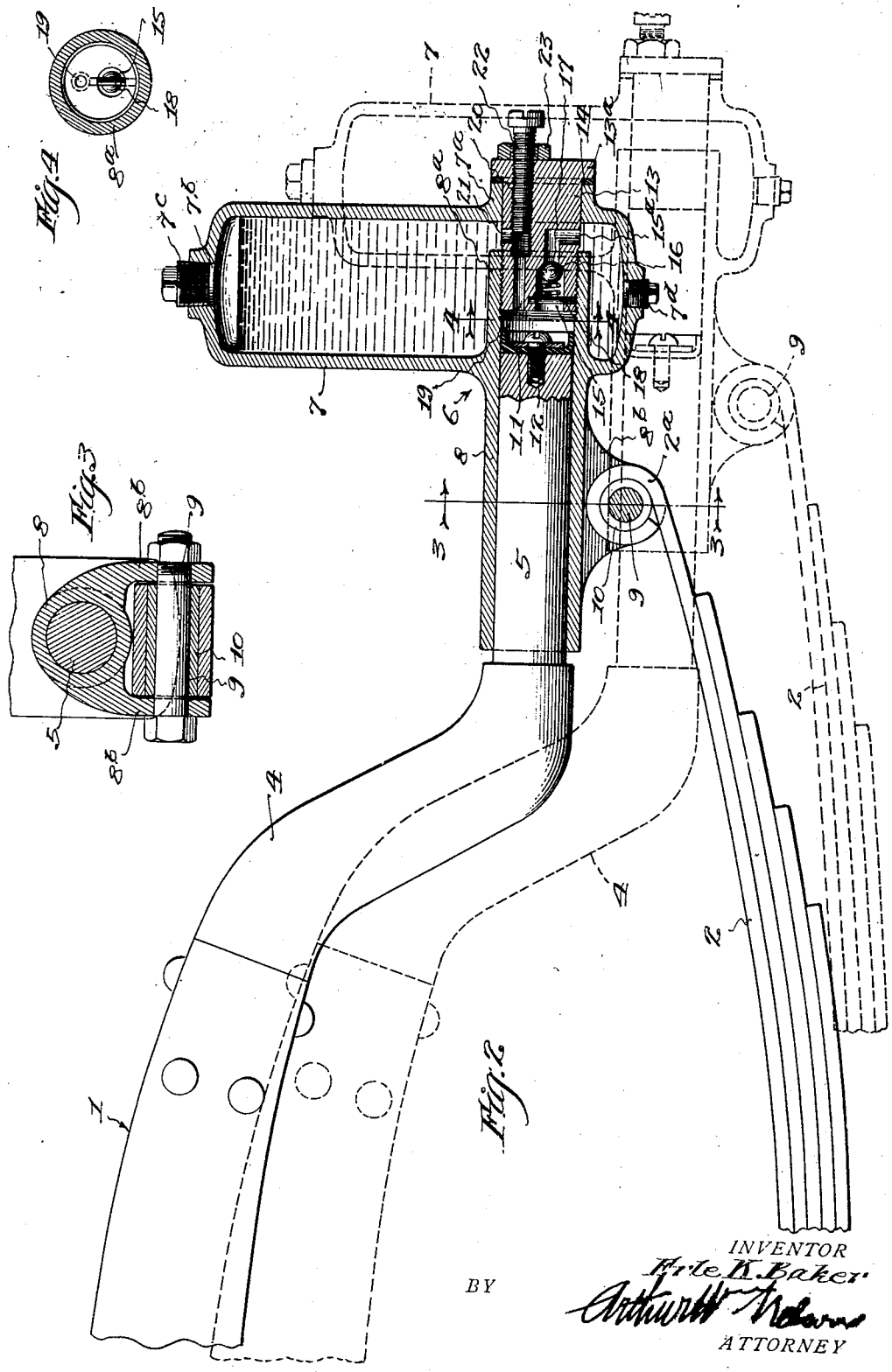

Patented June 23, 1931

1,810,897

UNITED STATES PATENT OFFICE

ERLE K. BAKER, OF CHICAGO, ILLINOIS

CHASSIS SPRING CONTROL

Application filed April 18, 1928. Serial No. 271,015.

This invention relates to improvements in chassis spring control and it consists of the matters hereinafter described and more particularly pointed out in the appended claims.

The primary object of the invention is to provide a simple arrangement of parts between one portion of an automobile frame member and associated supporting spring to control the action of the spring so that road shocks will be minimized.

Another object of the invention is to provide such a control as operates hydraulically for its intended purpose and in which the parts thereof shall be so arranged as to prevent side sway of the automobile, and resulting shimmying under high speeds.

Still another object of the invention is to provide a construction for controlling spring action which construction depends for its efficient operation upon the resulting longitudinal movement of the spring end with which it is associated when the same flexes under road shocks or jars.

The above-mentioned objects of the invention as well as others together with the many advantages thereof will more fully appear as I proceed with my specification.

In the drawings:—

Fig. 1 is a view in side elevation of one end of an automobile frame member and its associated spring together with my improved construction so arranged with respect thereto as to control the action of said spring.

Fig. 2 is a view partly in side elevation and partly in longitudinal vertical section, on an enlarged scale of parts shown at the "horn" end of Fig. 1.

Fig. 3 is a transverse vertical sectional view through a part of the construction shown in Fig. 2 as taken on the line 3—3 of Fig. 2.

Fig. 4 is another transverse vertical detail sectional view as taken on the line 4—4 of Fig. 2.

Fig. 5 is a view similar to Fig. 2 illustrating a modified form of construction.

In carrying out the invention, I provide a construction which makes use of such longitudinal movement of one end of an automobile spring as occurs in the flexing of the spring under road shocks and jars to actuate certain associated parts to control the action of said springs. In this way road shocks and jars are minimized.

Referring now in detail to that embodiment of the invention illustrated in Figs. 1 to 4 inclusive, in the accompanying drawings, 1 indicates as a whole the rear end portion of an automobile frame member and 2 indicates the usual leaf spring supporting said end of the frame member from an axle 3 to which the spring is secured at a point between its ends as by the clamps in the manner well known. In this instance the topmost leaf of the spring has the usual end eyes $2^a$—$2^a$ such as is found in common practice, one thereof being connected by a bolt to a bracket $2^b$ on said frame member in the manner well known which prevents any longitudinal movement of said end of the spring. Secured to the frame end 1 is a downwardly curved member or horn 4 which terminates in a horizontally disposed longitudinally extending cylindrical part 5 which because of its action will be later referred to as a "plunger."

6 indicates as a whole a hollow member formed to provide an upright cylindrical casing 7 and a horizontal tubular barrel or cylinder 8 disposed in a plane above the bottom of said casing. Said barrel has an inner end part $8^a$ which is located within and extends a part way across the casing, and in one wall of said casing in line with said sleeve is a tubular boss $7^a$. In the top wall of said casing is provided an inlet opening $7^b$ by means of which a lubricating fluid may be introduced into said casing and this opening may be closed by a threaded plug $7^c$ which has an air vent duct therein as shown in dotted lines in Fig. 2. In the bottom end of the casing is a cleanout opening closed by a plug $7^d$.

That part of the barrel or cylinder 8 without the casing is of sufficient length to receive the plunger 5. Said barrel part just mentioned is provided on opposite sides, at a point substantially midway between its ends with downwardly extending ears 8ᵇ—8ᵇ to receive the adjacent spring eye 2ᵃ and be connected thereto by a bolt 9; a bushing 10 being interposed between said eye and bolt. On the extreme end of the plunger 5 is carried a leather cup gasket 11 held in place by a screw and washer 12, said gasket facing toward the interior of the casing 7.

13 indicates a valve plug which may be inserted through the boss 7ᵃ of the casing so that its inner end will have a screw threaded engagement with the barrel part 8ᵃ. The outer end of said plug has a rectangular head 13ᵃ of larger diameter and interposed between said head and the end of the casing boss 7ᵃ is a compressible gasket 14. When the plug is fully threaded into the sleeve part 8ᵃ, a good leak-tight joint is provided between the head end of the plug and the end of said boss 7ᵃ.

In the bottom part of the inner end of the plug is a longitudinal conduit or passageway 15 made of two different diameters with a valve seat 16 therebetween. One end of said passageway opens by a port 15ᵃ into the bottom of the casing while the other end of said passageway opens into the interior of said barrel part 8ᵃ. A ball valve 17 is normally held against the seat 16 by a spring and pin arrangement 18 so as to prevent passage of lubricant from the interior of the barrel part 8ᵃ to the bottom part of the casing but permits a free passage of lubricant in the reverse direction under conditions later to appear. In the top part of the plug is a passageway which extends from end to end of the plug. The inner end 19 of this passageway is of a diameter smaller than the port 15ᵃ before mentioned. The outer end 20 of said passageway is of a diameter greater than the inner end and a port 21 connects said outer end of said passageway with the interior of the casing. Threaded into the passageway part 20 from the head end of the plug 13 is a valve stem 22 in the form of an ordinary machine screw, the inner end of which controls the effective amount of opening of the port 21. By means of a screw driver, the valve stem may be adjusted inwardly or outwardly to control the amount of fluid passing through said passageway and port into the interior of the casing. A lock nut 23 is disposed upon the screw stem to so engage the head end of the plug as to lock the same in the proper position.

Assume that the parts are in the position shown in full lines in Fig. 1 and that the automobile in which the construction is embodied hits an obstruction or bump in the road the spring 2 of course will flex and cause a relative movement between the horn and spring toward each other. The relative movement of spring and frame toward each other causes the end of the spring not secured to the frame to have longitudinal movement. Such movement of this end of the spring will cause the member 6 as a whole to move outwardly on the plunger and thus enlarge the chamber in the sleeve part 8ᵃ between the ends of the plunger and plug respectively. This relative movement of the parts is shown by means of dotted lines in Fig. 2. Of course, this chamber as it increases in length produces a vacuous condition therein so that the lubricant in the bottom part of the casing passes up through the port 15ᵃ and past the ball valve which opens so that said chamber between the plunger and plug end will fill up with lubricant. As said passageway is of quite a substantial diameter, the lubricant passes freely therethrough and no appreciable resistance is offered thereto.

On the rebound however, the parts are given a reverse movement, thus placing the fluid in the plunger chamber under pressure. This pressure of course, causes the ball valve to immediately close upon its seat and thus prevent any passage of lubricant therethrough. However, as the valve stem 22 is open the desired amount with respect to its port 21, the lubricant under pressure enters the passageway parts 19 and 20 and passes out through the port 21 into the casing. With the passageway part 19 and port opening being of a small diameter, there is presented quite a resistance to the flow of lubricant therethrough with the result that this flow is accordingly retarded and thereby restrains the rebound of the spring. This rebound movement may be controlled as desired by adjusting the valve stem 22.

In Fig. 5 I have illustrated a modified form of construction wherein like parts bear the same reference numerals as before. In the construction shown therein, I omit the leather cup gasket 11 from the free end of the plunger and provide a stuffing box 25 at the outer end of the barrel. This construction permits of a more positive full length lubrication between the engaging surfaces of the plunger and barrel and not only prevents leakage of the lubricant at this point but materially decreases the amount of wear between said plunger and barrel.

From the above description, it is apparent that a simple and efficient construction for controlling the action of automobile springs is provided. The parts thereof are comparatively few in number, and are easy to assemble and maintain. Again when in place upon an automobile, the device prevents lateral movement of the automobile body, thus eliminating one of the objectionable causes to automobile instability.

It is also pointed out that should the automobile thus equipped, strike such a hard bump as to cause the springs to be flexed downwardly beyond a horizontal position the barrel will in effect act to move inwardly on the plunger. Thus the lubricant will be compressed between the valve plug and plunger and will pass slowly through the passageway part 19 and port 21 to thereby control the spring action as is apparent. In this manner the spring action is held fully under control at both limits of its movement.

In describing the invention, I have referred in detail to the form and arrangement of the various parts thereof, the same as is to be considered as by way of illustration and not by way of limitation except as may be specifically set forth in the appended claims.

I claim as my invention:—

1. A chassis spring control embodying therein a barrel element, a fluid reservoir connected thereto, a plunger element positioned in said barrel element the one being longitudinally movable with respect to the other, one of said elements being carried by a fixed part of an automobile and the other being connected to the end of the spring which as it flexes causes relative longitudinal movement between said elements alternately withdrawing and returning fluid to said reservoir.

2. A chassis spring control embodying therein, a plunger carried by a frame member of an automobile, a barrel in which said plunger slides, a fluid reservoir, a valve structure connecting the same with said barrel, which barrel is operatively connected to the spring associated with said frame member, said spring in its flexing movement causing a relative longitudinal movement between said plunger and said barrel which causes a filling of the barrel with fluid from said reservoir and a discharging of the same back into said reservoir.

3. A chassis spring control embodying therein a plunger carried by an automobile frame member, a barrel in which said plunger slides, which barrel is operatively connected to a spring associated with said frame member and a lubricant reservoir associated with and disposed above said barrel and operatively connected thereto.

4. A chassis spring control embodying therein a plunger fixed at one end to an automobile frame member, a barrel in which said plunger slides, means operatively connecting said barrel with a spring associated with said frame member and a lubricant reservoir on top of said barrel.

5. A chassis spring control construction, means providing a member rigidly fixed with respect to an automobile frame member, a spring associated with said frame member, a barrel movable longitudinally on said rigidly fixed member from one end thereof and connected to said spring a fluid casing on top of said barrel and a two way valve between said casing and barrel to regulate the movement of said spring.

6. A chassis spring control construction, a fixed member, a barrel movable longitudinally on said fixed member, a lubricant casing on top of said barrel and a two way valve between said casing and barrel, said barrel having laterally spaced ears to receive a spring eye which is pivotally connected to said ears.

7. In combination with an automobile frame member a horn member associated therewith and having a plunger, a barrel mounted on said plunger for a relative longitudinal movement, a fluid casing on that end of the barrel associated with the free end of the plunger, a plug engaging in a part of said casing and barrel respectively and valve mechanism for controlling the passage of fluid from said casing into said barrel and from said barrel back into said casing at different rates of flow.

8. In a device of the kind described, a casing having a barrel opening through one side thereof at a point between its ends, said barrel having at least one ear for attachment to the eye of a spring member.

9. A chassis spring control embodying therein a plunger carried by a frame member, a barrel carried by a spring member and engaging said plunger, a lubricant reservoir on one end of said barrel and means providing a stuffing box between the other end of said barrel and said plunger.

10. A chassis spring control embodying therein a frame, a spring having at least one end secured thereto and adapted to flex and in so flexing to cause movement of a part thereof longitudinally with respect to the point secured to the frame, a barrel member, a plunger member operable therein, one of said members being rigidly secured to a stationary part of the automobile against movement, and means connecting the other of said members to that part of said spring having said longitudinal movement in the flexing thereof.

11. A chassis spring control embodying therein a chassis member having a horizontally extending plunger member of circular cross section, a supporting spring for said member and connected at one end thereto against endwise movement, a barrel mounted on the plunger for an endwise movement thereon, a fluid holding casing above and communicating with said barrel, means connecting the bottom portion of the barrel to the other end of the spring for guiding it in a horizontal direction in the flexing of the spring and means between the barrel and casing for permitting a freer flow of fluid from the casing to the barrel in one direction of movement of the last mentioned spring end and a more restricted flow in the other direction of movement of said last mentioned spring end.

12. A chassis spring control embodying therein a fluid casing having a horizontally disposed barrel, a plunger fixed with respect to the chassis and slidable in said barrel which is operatively connected to said chassis spring and a valve plug engaged in a part of said barrel and controlling the passage of fluid from said casing into the barrel at one rate of flow and from said barrel back into the casing at another but slower rate of flow during the flexing of said spring.

In testimony whereof, I have hereunto set my hand, this 13th day of April, 1928.

ERLE K. BAKER.